(12) United States Patent
Chataigner

(10) Patent No.: US 7,941,291 B2
(45) Date of Patent: May 10, 2011

(54) METHOD AND APPARATUS FOR CALCULATING A DISTANCE IN ASSEMBLY OPERATION

(75) Inventor: Gabriel Chataigner, Rocheserviere (FR)

(73) Assignee: Europlacer Industries SA, Rocheserviere (FR)

(*) Notice: Subject to any disclaimer, the term of this patent is extended or adjusted under 35 U.S.C. 154(b) by 511 days.

(21) Appl. No.: 11/920,180

(22) PCT Filed: May 10, 2006

(86) PCT No.: PCT/GB2006/001715
§ 371 (c)(1),
(2), (4) Date: Feb. 27, 2008

(87) PCT Pub. No.: WO2006/120441
PCT Pub. Date: Nov. 16, 2006

(65) Prior Publication Data
US 2009/0132200 A1    May 21, 2009

(30) Foreign Application Priority Data
May 10, 2005 (GB) .................................. 0509450.3

(51) Int. Cl.
*G01P 11/00* (2006.01)
*G01B 5/02* (2006.01)

(52) U.S. Cl. ...................................... 702/149; 702/158

(58) Field of Classification Search ............. 702/33, 702/149, 158; 701/46; 356/375; 700/56; 318/560
See application file for complete search history.

(56) References Cited

U.S. PATENT DOCUMENTS

| 5,285,946 | A | * | 2/1994 | Tomigashi et al. | 228/9 |
| 6,229,608 | B1 | | 5/2001 | Morris | |
| 6,250,538 | B1 | | 6/2001 | Grasmueller et al. | |
| 7,076,314 | B2 | * | 7/2006 | Saitou | 700/56 |

FOREIGN PATENT DOCUMENTS

| DE | 26 43 148 | 3/1978 |
| EP | 1 255 430 | 11/2002 |
| EP | 1 414 059 | 4/2004 |

* cited by examiner

*Primary Examiner* — Bryan Bui
(74) *Attorney, Agent, or Firm* — Drinker Biddle & Reath LLP

(57) ABSTRACT

A method and apparatus for calculating distance in an assembly operation. The method includes the steps of providing an assembly comprising a first part, a second part and a driver coupled to the first part. The driver arranged to selectively move the first part relative to the second part. The method also includes actuating the driver to selectively move the first part between a first known position and a second position and registering speed and/or acceleration data of the driver between the first known position and the second position. The time interval for the first part to move between the first known position and the second position is measured. The distance moved by the first part between the first known position and the second position using the measured time interval and the data registered from the driver can then be calculated.

21 Claims, 2 Drawing Sheets

METHOD AND APPARATUS FOR CALCULATING A DISTANCE IN ASSEMBLY OPERATION

RELATED APPLICATIONS

This Application is the U.S. National Phase Application of PCT International Application No PCT/GB2006/001715 filed May 10, 2006.

1. Field of the Invention

The present invention relates to a method and apparatus for calculating distance in an assembly operation. The invention also provides a method for re-adjusting the distance for the next or subsequent assembly operations following calculation of the distance for a previous assembly operation. In particular, the assembly operation can include pick-up and placement operations performed by assembly machines.

2. Description of the Related Art

Assembly machines are often used to pick-up and place components in order to assemble mechanical or electrical parts. Typically, the machines are capable of three-dimensional movement. It is often necessary to accurately control this movement in the X and Y directions to ensure that components are picked up from or placed in the correct location. It is also desirable to monitor the height of the pick up or placement operation in the Z direction. However, for many assembly machines, height in the Z direction is often the least known co-ordinate, which can have adverse consequences for pick-up and placement operations, leading to longer assembly times and a lower reliability of assembly operations.

There may be several reasons why the Z co-ordinate is less well known than the X and Y coordinates. For example, the assembly machine structure may not be sufficiently precise or stable in the Z direction and the increased cost required to improve control in the Z direction may not be justified. Additionally, the assembly machines can be affected by the components which they manipulate. For example, the surface from which the components are picked up, or on which they are placed can be unpredictable; for instance the surface may be tape, plastic sticks or the like. As a result the accuracy of the machine in the Z direction may be reduced. Furthermore, there is likely to be variation in the pick-up and placement planar surface, which therefore means that an absolute value for the Z height for each operation is not appropriate.

In order to alleviate the affects of variable Z height, some handling heads on assembly machines are fitted with a retractable tool to compensate for some Z imprecision.

BRIEF SUMMARY OF THE INVENTION

According to a first aspect of the present invention, there is provided a method for calculating distance in an assembly operation, the method comprising the steps of:
- providing an assembly comprising a first part, a second part and driver means coupled to the first part, wherein the driver means are arranged to selectively move the first part relative to the second part;
- actuating the driver means to selectively move the first part from a first known position into a second position;
- registering speed and/or acceleration data of the driver means between the first known position and the second position;
- measuring the time interval for the first part to move between the first known position and the second position; and
- calculating the distance moved by the first part between the first known position and the second position using the measured time interval and the data registered from the driver means.

According to the first aspect of the present invention, there is provided apparatus for calculating distance in an assembly operation, the apparatus comprising a first part, a second part, measuring means and a driver means coupled to the first part, wherein the driver means is arranged to selectively move the first part relative to the second part and wherein the driver means is actuable to move the first part between a first known position and a second position at a registered speed and/or acceleration, and wherein the measuring means are arranged to measure the time interval taken for the first part to move between the first known position and the second position to thereby enable calculation of the distance between the first known position and the second position.

The assembly operation can be a pick up operation or a placement operation. The first part can be engagement means, arranged to selectively engage a component. The second part can be a component receiving member arranged to selectively accommodate a component. Thus, the method and apparatus are suitable for use with so-called "pick and place" machines. The engagement means can pick-up a component from a component receiving member in a pick-up operation and can also deposit the component on a different component receiving member in a placement operation.

The calculated distance is preferably in a Z (vertical) direction.

A sensor means can be coupled to the assembly or apparatus. The first known position can be detected using sensor means. The sensor means can be operable in at least two states and can be arranged such that a transition from one state to the other occurs at the first known position.

The first known position can be in the region of a transitional area where the first part and the second part move from being spaced relative to one another to being in contact with one another. The first part and the second part can be considered to be in contact with one another when they are in indirect contact with one another, for example, when a component is positioned therebetween and the first part is in contact with the component as well as the second part being in contact with the component.

The second position can correspond to a position in which the first part and the second part are in pressed engagement with one another. As described above, the first and second part can be in indirect pressed engagement with one another.

The method and apparatus of the present invention are particularly useful for assembly operations where the second height is variable or unknown. For example, this may occur where there are dimensional variations of each second part.

The first part can be provided with resilient means arranged to at least partially deform as the first part moves between the first known position and the second position. Preferably the resilient means comprises a spring means. Where movement of the first known position results in deformation of the resilient means, the distance calculated can be used to evaluate the amount of deformation of the resilient means.

Preferably, the time interval is calculated as the first part is moved from the second position to the first known position. The first part can be stationary at the second position. The data can be registered from the driver means on actuation thereof, which actuation causes the first part to move from being stationary at the second position to the first known position. The first known position can be detected on operation of the sensor means. The sensor means can be coupled to the driver means in order to register the end point of the time interval and therefore the relevant registered data. Thus the driver means can hold the first part stationary when the first part is in pressed engagement with the second part.

The method can further include the step of providing a programmable driver means. The driver means can be programmed in response to the distance calculation.

According to a second aspect of the present invention, there is provided a method for calculating and readjusting distance in an assembly operation, comprising the steps of:

calculating distance in an assembly operation according to the first aspect of the invention;

evaluating the difference between a theoretical distance and the calculated distance, between the first known position and the second position;

determining a correction factor based on the evaluated difference;

re-evaluating a theoretical optimum distance of the second position relative to the first known position using the correction factor; and programming the driver means, such that on actuation thereof for a subsequent assembly operation, the first part is moved relative to the first known position by the theoretical optimum distance evaluated for the second position.

The method steps of the second aspect of the invention can be repeated in order to make the calculating and readjusting distance a continuous process. Thus, real time calculations of the distance can be used to readjust and optimize the second position based on theoretical and calculated values, thereby optimising assembly time and decreasing the risk of failure of each assembly operation.

The correction factor can be such that the theoretical optimum distance is equal to the calculated distance for the previous operation. Alternatively, the theoretical optimum distance can be a certain proportion of the evaluated difference between the initial theoretical distance and the calculated difference.

BRIEF DESCRIPTION OF THE DRAWINGS

An embodiment of the present invention will now be described with reference to and as shown in the accompanying drawings, in which:—

DETAILED DESCRIPTION OF THE INVENTION

Figure 1:
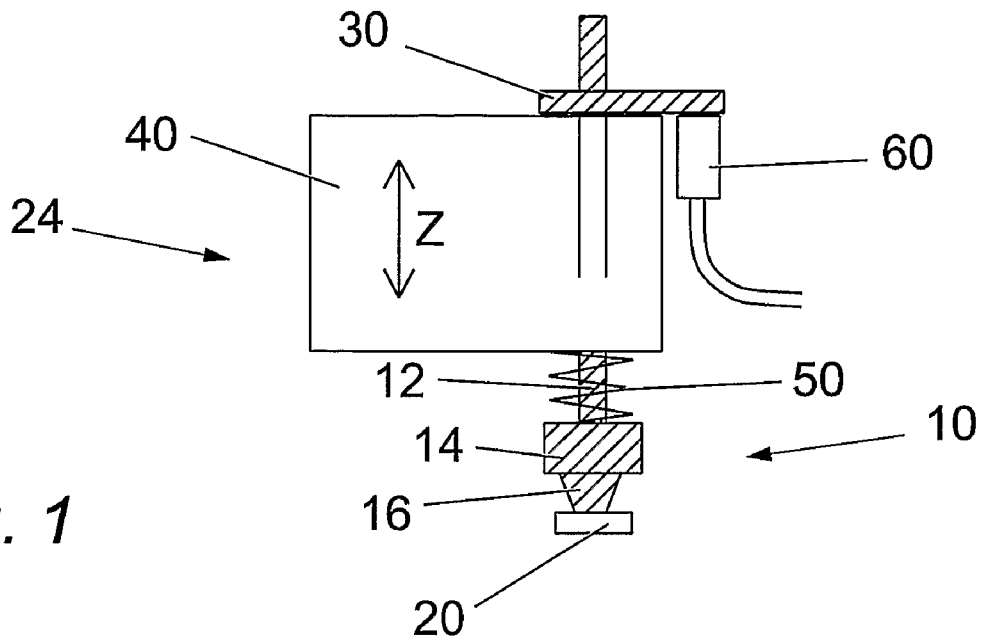
FIG. 1 is a schematic side view of an assembly head apparatus in accordance with the present invention.
Figure 2:
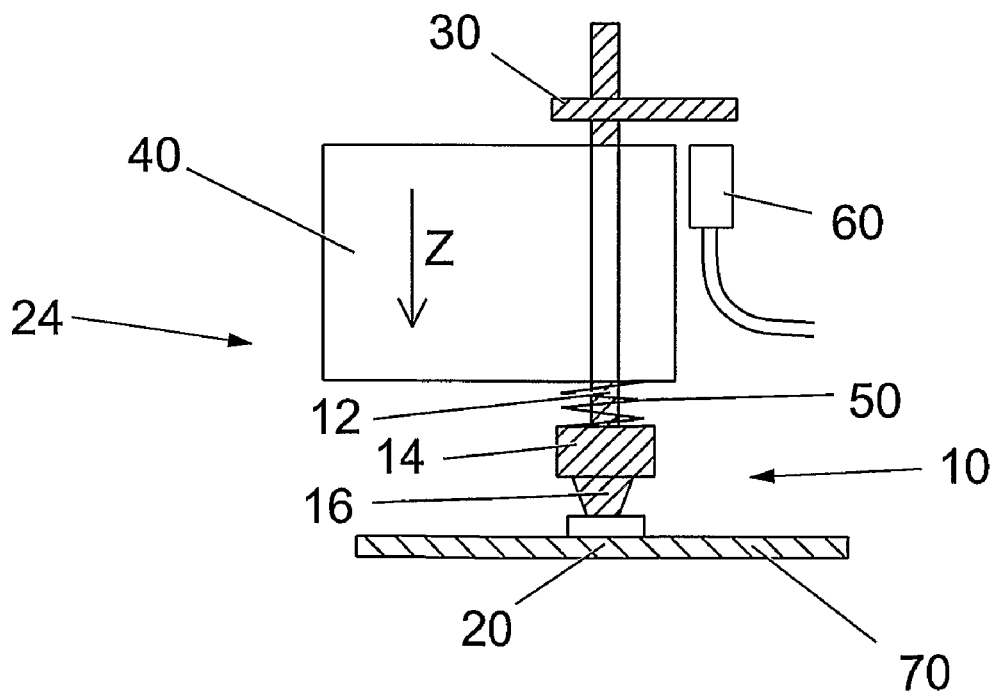
FIG. 2 is a schematic side view of the apparatus of FIG. 1.

Part of an assembly head apparatus is shown generally at 24 in FIGS. 1 and 2. The assembly head apparatus 24 includes a pick up tool 10 at the lower end thereof. The pick-up tool 10 comprises a shaft 12, a head 14 and a tip 16. The longitudinal axis of the shaft 12 defines a z-axis.

The tip 16 is arranged to selectively engage a component 20 such as an electronic component to be placed onto a target member 70 such as a printed circuit board during assembly thereof. FIGS. 1 and 2 show the tip 16 engaging the component 20, which is maintained in position on the tip 16 through the action of a vacuum system within the tool head 14. In an alternative embodiment, a mechanical grip incorporated into the tip 16 can be used to secure the component 20 in position.

The shaft 12 is slidably accommodated within a support 40. A spring 50 is provided surrounding the shaft 12 and acts between the upper end of the tool head 14 and the lowermost face of the support 40. The tool 10 is maintained in a first position shown in FIG. 1 in which the support 40 abuts a stop member 30, as a result of the bias of the spring 50. The support 40 is coupled to and driven by a programmable motor (not shown). The programmable motor can be a servo motor or a stepper motor. Alternatively, another type of actuator can be employed such as an electromagnet or an air cylinder with a suitable encoder which can register the required data. The programmable motor is arranged to drive the support 40 along the Z axis.

A position sensor 60 is secured to the support 40 and is movable therewith. The position sensor 60 can be any suitable sensor such as an optical, magnetic or electronic sensor or a mechanical switch. In the present embodiment, the sensor 60 is operable in two states (such as 'on' and 'off') The sensor 60 can determine the distance between the support 40 with reference to the stop member 30 in the Z direction and is arranged to switch between one state (such as 'on') and the other (such as 'off') when the sensor is at a predetermined position in relation to the stop member 30.

FIG. 2 shows the component 20 in contact with the target member 70. The target member 70 is a printed circuit board and therefore FIG. 2 is representative of a placement operation, in which the tip 16 with attached component 20 is brought into contact with the target member 70 in order to deposit the component 20 thereon. Alternatively, the target member 70 can be component packaging during a pick up operation, since the tool 10 occupies similar relative positions with respect to the remaining parts of the assembly head 24 during both the pick up and the placement operation. For example, during the pick up operation, the tip 16 moves towards the target member 70 in order to pick up a component 20.

Before performing the placement operation, the assembly head 24 performs a pick up operation in order to couple the component 20 and the tip 16, as shown in FIG. 1. The assembly head 24 with the component 20 coupled thereto is then moved into position over the target member 70. Once the component 20 and the target member 70 are in close relation, the programmable motor is actuated to move the support 40 downwards in the Z direction, against the bias of the spring 50 and away from the stop member 30. This action causes relative movement of the shaft 12 within the support 40 and compression of the spring 50. Once the support 40 and coupled sensor 60 reach the predetermined distance from the stop member 30, the sensor 60 switches from one state to the other.

In order to complete the placement operation the component 20 needs to be deposited on the target member 70 with sufficient pressure to secure the component 20 to the target member 70. Therefore, once the sensor 60 has switched from one state to the other, there should be continued downward movement of the support 40 in the Z direction in order to press the component 20 and the target member 70 into closer contact with one another. The additional pressure ensures that the component 20 attaches to the target member 70 whilst the spring compensates by absorbing some of the force when the additional pressure applied via the continued downward movement of the support 40 is too great.

Figure 3:
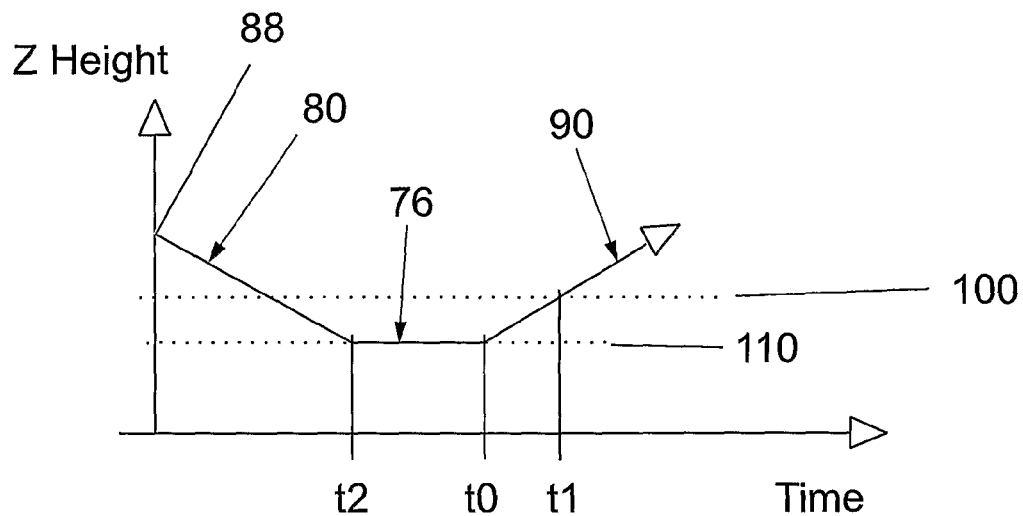
FIG. 3 is a graph of height of a support of the apparatus of FIG. 1 in the Z direction versus time.

FIG. 3 is a graphical representation of height in the Z direction of the support 40 over a period of time. Line A on the graph represents movement of the support 40 from a nominal height 88 (that shown in FIG. 1) to a final placement height 110 (that shown in FIG. 2), followed by a retraction of the support 40 away from the final placement height 110.

The portion of the graph labelled 80 represents downward movement of the support 40 driven by the programmable motor from the start height 88 to the placement height 110. Movement of the support 40 will cause an approximately corresponding movement of the tip 16 and coupled component 20 down to the Z height 100. Z height 100 is the height at which the sensor 60 will register the predetermined distance between the stop member 30 and the support 40 and will thus change state. Beyond the Z height 100 continued downward movement of the support 40 pushes against the bias of the spring 50 to ensure that the component 20 is firmly pressed into engagement with the target member 70.

The support 40 reaches the lowest Z height 110 at time t2. The support 40 is held at a constant Z height during a portion of the graph labelled 76 between time t2 and time t0. During the portion 76, the vacuum in the tool head 14 is stopped so that the component 20 is no longer secured to the tip 16. Thus, the component 20 is deposited onto the target member 70.

Once this placement operation is complete, the programmable motor actuates the support 40, in order to move the support 40 from being stationary at t0 in an upward direction, thereby relieving the pressure forcing the tip 16 into contact with the target member 70. A portion of the graph 90 represents the upward movement of the support 40 in the Z direction which begins from the placement height 110 at time t0. Acceleration and velocity of the support 40 are registered by the programmable motor when the support 40 is moved upwardly at time t0. As shown in the portion 90, the sensor 60 switches state again at time t1 when the sensor 60 detects that the support 40 is at the predetermined distance from the stop member 30. The time interval between initial movement of the support 40 at time t0 and when the sensor 60 changes state at time t1 is recorded.

Providing maximum speed is not reached in the Z direction and the initial speed and acceleration along with the time interval from t0 to t1 is known, the distance s between Z height 110 and 100 can be calculated as follows:

$$s = 0.5 \times (Z\ acceleration) \times (t1-t0)^2$$

Thus parameters of acceleration and velocity registered by the motor and the measured time interval allow the distance s between Z heights 100 and 110 to be calculated. Since Z height 100 is the point at which the sensor 60 changes state and should be known, the height 110 in the Z direction, which corresponds to the height of the upper surface of the target member 70 can be calculated with precision. The height difference between 110 and 100 is proportional to and therefore gives an indication of the amount of spring 50 compression. Thus, the actual pressure applied by the tool 10 on the target member 70 can be determined with reference to the optimum pressure.

For the first assembly operation, an estimate is made of the Z coordinate at which the target member is predicted to be positioned. Thus, the programmable motor drives the support 40 until time t2 to a theoretical height 110 for optimum spring crushing. For repeated pick up or placement operations calculated data for the actual Z height 110 can be fed into the programmable motor and a new estimated Z height 110 can be determined.

Usually, consecutive components 20 are placed in different locations during the placement operation. However, where each consecutive component 20 is placed adjacent the previous component 20, the Z height in the placement operation can be readjusted wholly or partially in response to the previously calculated Z height 110.

Figure 4:
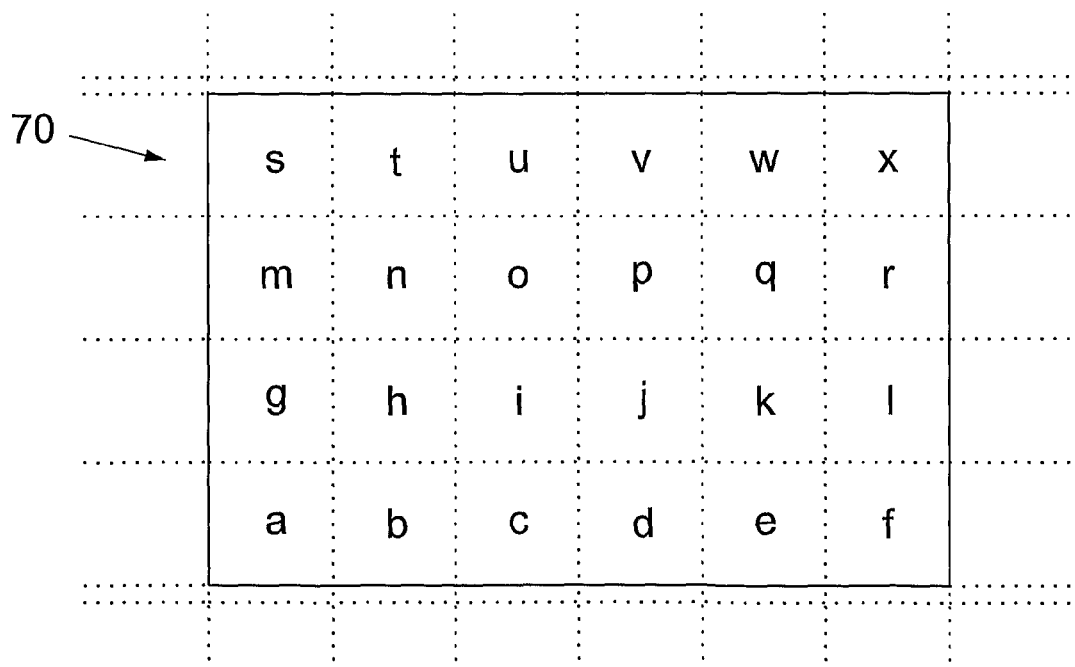
FIG. 4 is a grid with letters denoting different placement areas for the apparatus of FIG. 1.

FIG. 4 shows a target member 70 divided into notional lettered portions a-x. Once a measurement for the Z height 110 and spring 50 compression has been taken for the placement operation in one portion, a suitable correction factor can be used for all placement operations within that portion. In the event that one of the spring 50 crushing measurements varies from the optimum spring 50 crushing in one of the lettered portions, a partial correction can be used for adjoining portions. For example, if a significant correction is required as a result of measured spring 50 crushing in portion 'i', a partial correction will be required for adjoining portions: b, c, d, h, j, n, o, p.

The same procedure can be employed for the pick up operation. Each component 20 can be picked up from a magazine at the same X-Y position. The correction of the Z pick up height 110 for each magazine can be determined by taking into account the measured spring 50 crushing during pick up of the previous component 20 in the same magazine.

The method allows real time calculations to be made by measuring the time difference between t0 and t1 from when the support 40 begins its upward movement until the sensor 60 changes state. The real time calculation of spring 50 compression enables the motor to be reprogrammed in real time to adjust Z height for future operations. Several commercial benefits are associated with this method including the fact that assembly time can be optimised per operation and therefore improved assembly rates can be obtained.

Modifications and alterations can be made without departing from the scope of the invention. Although in the described embodiment the assembly head 24 moves with respect to the target member 70, the relative movement to bring part of the assembly head into contact with the target member 70 could occur due to motion of the target member 70 or due to motion of both the target member 70 and the assembly head 24. The method and apparatus as described herein is also suitable for use with assembly machines in fields other than electronic printed circuit boards.

The invention claimed is:

1. A method of calculating distance in an assembly operation, the method comprising the steps of:
   providing an assembly comprising a first part, a second part and a driver coupled to the first part, and a sensor, wherein the driver is arranged to selectively move the first part relative to the second part;
   detecting the first known position using the sensor;
   actuating the driver to selectively move the first part between the first known position and a second position;
   registering speed and/or acceleration data of the driver between the first known position and the second position;
   measuring the time interval for the first part to move between the first known position and the second position; and
   calculating the distance moved by the first part between the first known position and the second position using the measured time interval and the data registered from the driver;
   evaluating the difference between a theoretical distance and the calculated distance, between the first known position and the second position;
   determining a correction factor based on the evaluated difference;
   re-evaluating a theoretical optimum distance of the second position relative to the first known position using the correction factor; and
   programming the driver, such that on actuation thereof for a subsequent assembly operation, the first part is moved relative to the first known position by the theoretical optimum distance evaluated for the second position.

2. A method according to claim 1, further comprising providing the first part with an engagement mechanism arranged to selectively engage a component.

3. A method according to claim 1, wherein the second part is a component receiving member capable of selectively accommodating a component.

4. A method according to claim 1, wherein the distance calculated is in a Z direction.

5. A method according to claim 1, further comprising operating the sensor in at least two states, such that a transition from one state to the other occurs at the first known position.

6. A method according to claim 1, further comprising coupling the sensor to the driver.

7. A method according to claim 1, wherein the second position corresponds to a position in which the first part and the second part are in pressed engagement with one another.

8. A method according to claim 1, wherein the second position is variable from one assembly operation to the next.

9. A method according to claim 1, further comprising providing the first part with a resilient member arranged to at least partially deform as the first part moves between the first known position and the second position.

10. A method according to claim 9, wherein the resilient member comprises a spring.

11. A method according to claim 9, further comprising evaluating the amount of deformation of the resilient member using the calculated distance.

12. A method according to claim 1, further comprising measuring the time interval between moving the first part from the second position to the first known position.

13. A method according to claim 12, further comprising moving the first part from stationary at the second position.

14. A method according to claim 13, further comprising measuring the time interval from initial actuation of the driver to move the first part from the second position to detection of the first known position by the sensor.

15. A method according to claim 1, further comprising providing a programmable driver.

16. A method according to claim 15, further comprising reprogramming the driver in response to the distance calculation.

17. A method according to claim 1, further comprising repeating the method steps to continuously calculate and readjust the distance for subsequent assembly operations.

18. A method according to claim 1, further comprising selecting the correction factor such that the theoretical optimum distance is equal to the calculated distance for the previous operation.

19. A method according to claim 1, further comprising selecting the correction factor such that the theoretical optimum distance is a proportion of the evaluated difference between the initial theoretical distance and the calculated difference.

20. Apparatus for calculating distance in an assembly operation, the apparatus comprising a first part, a second part, a measurement device, and a sensor, and a driver coupled to the first part, wherein the driver is arranged to selectively move the first part relative to the second part and wherein the driver is actuable to move the first part between a first known position and a second position at a registered speed and/or acceleration, wherein the sensor is operable to detect the first known position, and wherein the measurement device is arranged to measure the time interval taken for the first part to move between the first known position and the second position to thereby enable calculation of the distance between the first known position and the second position, and wherein the apparatus includes a component which determines a correction factor based on the evaluated difference, and re-evaluates a theoretical optimum distance of the second position relative to the first known position using the correction factor, and wherein the driver is adapted to be programmed such that on actuation thereof for a subsequent assembly operation, the driver is programmed to move the first part relative to the first known position by the theoretical optimum distance evaluated for the second position.

21. Apparatus according to claim 20, wherein the assembly operation is a pick up operation or a placement operation.

* * * * *

UNITED STATES PATENT AND TRADEMARK OFFICE
CERTIFICATE OF CORRECTION

| | | |
|---|---|---|
| PATENT NO. | : 7,941,291 B2 | |
| APPLICATION NO. | : 11/920180 | |
| DATED | : May 10, 2011 | |
| INVENTOR(S) | : Gabriel Chataigner | |

It is certified that error appears in the above-identified patent and that said Letters Patent is hereby corrected as shown below:

Title Page, Item (73) Assignee, change "Europlacer Industries SA" to
-- Europlacer Industries SAS --

Signed and Sealed this
Nineteenth Day of July, 2011

David J. Kappos
*Director of the United States Patent and Trademark Office*